(12) United States Patent
Bui-Van et al.

(10) Patent No.: US 12,487,355 B2
(45) Date of Patent: Dec. 2, 2025

(54) VEHICULAR DRIVING ASSIST SYSTEM USING RADAR AND COMMUNICATION WITH OTHER VEHICLES

(71) Applicant: Magna Electronics Inc., Auburn Hills, MI (US)

(72) Inventors: Ha Bui-Van, Aschaffenburg (DE); Wilhelm Johann Wolfgang Wöhlte, Sailauf (DE)

(73) Assignee: Magna Electronics Inc., Auburn Hills, MI (US)

( * ) Notice: Subject to any disclaimer, the term of this patent is extended or adjusted under 35 U.S.C. 154(b) by 516 days.

(21) Appl. No.: 18/155,139

(22) Filed: Jan. 17, 2023

(65) Prior Publication Data

US 2023/0243962 A1     Aug. 3, 2023

Related U.S. Application Data

(60) Provisional application No. 63/267,243, filed on Jan. 28, 2022.

(51) Int. Cl.
*G01S 13/931*     (2020.01)
*B60W 60/00*     (2020.01)
*G01S 13/89*     (2006.01)

(52) U.S. Cl.
CPC ......... *G01S 13/931* (2013.01); *B60W 60/001* (2020.02); *G01S 13/89* (2013.01); *B60W 2420/408* (2024.01); *B60W 2554/402* (2020.02); *B60W 2554/404* (2020.02); *B60W 2556/65* (2020.02); *G01S 2013/9318* (2020.01)

(58) Field of Classification Search
CPC ............... G01S 13/931; G01S 13/89; G01S 2013/9318; B60W 60/001; B60W 2554/402; B60W 2554/404; B60W 2556/65; B60W 2420/408
USPC .......................................................... 342/70
See application file for complete search history.

(56) References Cited

U.S. PATENT DOCUMENTS

| | | | | |
|---|---|---|---|---|
| 6,690,268 B2* | 2/2004 | Schofield | ............... | B60K 35/81 348/148 |
| 6,693,517 B2* | 2/2004 | McCarthy | ............. | G07F 7/0886 340/425.5 |
| 6,919,549 B2* | 7/2005 | Bamji | ................... | G01S 17/894 250/214 R |
| 7,157,685 B2* | 1/2007 | Bamji | ................... | H04N 25/772 250/214 R |
| 7,176,438 B2* | 2/2007 | Bamji | ..................... | G01S 7/487 250/214 R |

(Continued)

*Primary Examiner* — Nuzhat Pervin
(74) *Attorney, Agent, or Firm* — HONIGMAN LLP

(57) ABSTRACT

A vehicular sensing system includes a radar sensor disposed at a first vehicle and operable to sense objects within a field of sensing of the radar sensor. Responsive to a sensing system of a second vehicle detecting an object while the detected object is not within the field of sensing of the radar sensor of the first vehicle, the vehicular sensing system receives from the second vehicle one or more characteristics of the detected object while the detected object is not within the field of sensing of the radar sensor of the first vehicle. The vehicular sensing system, responsive to receiving the one or more characteristics of the detected object from the second vehicle, adjusts sensing by the radar sensor of the first vehicle based at least in part on the received one or more characteristics of the detected object.

24 Claims, 2 Drawing Sheets

(56) References Cited

U.S. PATENT DOCUMENTS

| | | | | |
|---|---|---|---|---|
| 7,203,356 | B2* | 4/2007 | Gokturk | G06T 9/001 375/E7.085 |
| 7,212,663 | B2* | 5/2007 | Tomasi | G01B 11/25 382/106 |
| 7,283,213 | B2* | 10/2007 | O'Connor | G01S 17/89 356/5.1 |
| 7,340,077 | B2* | 3/2008 | Gokturk | G06F 3/017 348/208.14 |
| 7,352,454 | B2* | 4/2008 | Bamji | G01S 17/36 257/E27.048 |
| 7,375,803 | B1* | 5/2008 | Bamji | H04N 5/2226 356/4.01 |
| 7,379,100 | B2* | 5/2008 | Gokturk | H04N 23/741 348/229.1 |
| 7,379,163 | B2* | 5/2008 | Rafii | G01C 3/08 356/4.07 |
| 7,405,812 | B1* | 7/2008 | Bamji | G01S 17/931 356/5.1 |
| 7,408,627 | B2* | 8/2008 | Bamji | G01C 3/08 356/5.1 |
| 7,580,795 | B2* | 8/2009 | McCarthy | B60R 1/12 701/484 |
| 8,013,780 | B2* | 9/2011 | Lynam | G01S 13/93 342/55 |
| 8,027,029 | B2* | 9/2011 | Lu | G01S 7/4817 356/28 |
| 8,849,494 | B1* | 9/2014 | Herbach | G05D 1/0044 701/24 |
| 9,036,026 | B2 | 5/2015 | Dellantoni et al. | |
| 9,146,898 | B2* | 9/2015 | Ihlenburg | B60W 10/18 |
| 9,463,744 | B2* | 10/2016 | Schofield | G06V 20/58 |
| 9,555,736 | B2* | 1/2017 | Solar | B60W 30/14 |
| 9,575,160 | B1* | 2/2017 | Davis | G01S 7/35 |
| 9,599,702 | B1* | 3/2017 | Bordes | G01S 13/18 |
| 9,682,725 | B2* | 6/2017 | Yamaoka | B62D 15/0255 |
| 9,689,967 | B1* | 6/2017 | Stark | G01S 7/0233 |
| 9,753,121 | B1* | 9/2017 | Davis | G01S 7/282 |
| 9,869,762 | B1* | 1/2018 | Alland | H01Q 21/08 |
| 9,954,955 | B2* | 4/2018 | Davis | G01S 13/34 |
| 10,176,720 | B2* | 1/2019 | Ushiba | B60W 60/0053 |
| 10,697,790 | B2* | 6/2020 | Sumizawa | G08G 1/096783 |
| 10,773,715 | B2* | 9/2020 | Yamanaka | G08G 1/14 |
| 10,819,943 | B2* | 10/2020 | Van Dan Elzen | H04N 23/66 |
| 10,836,376 | B2* | 11/2020 | Wodrich | B60W 30/02 |
| 10,866,306 | B2* | 12/2020 | Maher | G11C 11/409 |
| 11,312,353 | B2* | 4/2022 | Johnson | B60W 10/18 |
| 2012/0062743 | A1* | 3/2012 | Lynam | B60R 1/12 348/148 |
| 2012/0218412 | A1* | 8/2012 | Dellantoni | H04N 7/181 348/148 |
| 2013/0222592 | A1* | 8/2013 | Gieseke | G08G 1/096708 348/148 |
| 2014/0218529 | A1* | 8/2014 | Mahmoud | H04N 23/667 348/148 |
| 2014/0375476 | A1* | 12/2014 | Johnson | B60R 25/102 340/932.2 |
| 2015/0124096 | A1* | 5/2015 | Koravadi | G06V 20/584 348/148 |
| 2015/0158499 | A1* | 6/2015 | Koravadi | B60W 30/09 701/1 |
| 2015/0251599 | A1* | 9/2015 | Koravadi | B60Q 9/008 340/903 |
| 2015/0352953 | A1* | 12/2015 | Koravadi | B60K 35/60 701/36 |
| 2016/0036917 | A1* | 2/2016 | Koravadi | B60L 53/12 701/2 |
| 2016/0210853 | A1* | 7/2016 | Koravadi | G06V 20/56 |
| 2017/0074981 | A1* | 3/2017 | Lynam | G01S 13/867 |
| 2017/0222311 | A1* | 8/2017 | Hess | G01S 13/931 |
| 2017/0254873 | A1* | 9/2017 | Koravadi | G01S 3/14 |
| 2017/0276788 | A1* | 9/2017 | Wodrich | G01S 13/931 |
| 2017/0315231 | A1* | 11/2017 | Wodrich | G01S 13/87 |
| 2017/0356994 | A1* | 12/2017 | Wodrich | G01S 13/87 |
| 2018/0015875 | A1* | 1/2018 | May | B60Q 9/008 |
| 2018/0045812 | A1* | 2/2018 | Hess | G01S 7/4008 |
| 2018/0059236 | A1* | 3/2018 | Wodrich | G01S 13/867 |
| 2018/0065623 | A1* | 3/2018 | Wodrich | B60W 30/06 |
| 2018/0067194 | A1* | 3/2018 | Wodrich | G01S 13/931 |
| 2018/0231635 | A1* | 8/2018 | Woehlte | H01Q 21/0006 |
| 2019/0072666 | A1* | 3/2019 | Duque Biarge | G01S 13/9023 |
| 2019/0072667 | A1* | 3/2019 | Duque Biarge | G01S 13/4454 |
| 2019/0072668 | A1* | 3/2019 | Duque Biarge | G01S 13/505 |
| 2019/0072669 | A1* | 3/2019 | Duque Biarge | G01S 13/4454 |
| 2019/0339382 | A1* | 11/2019 | Hess | H04B 7/0413 |
| 2020/0116855 | A1* | 4/2020 | Jo | G01S 13/726 |
| 2020/0132802 | A1* | 4/2020 | Wöhlte | G01S 13/931 |
| 2020/0223429 | A1* | 7/2020 | Marsousi | G05D 1/0257 |
| 2020/0247369 | A1* | 8/2020 | Ahnfalk | B60W 50/085 |
| 2020/0271755 | A1* | 8/2020 | Wodrich | G01S 7/4008 |
| 2020/0361366 | A1* | 11/2020 | Miller | B60R 11/04 |
| 2021/0078598 | A1* | 3/2021 | Kim | B60W 10/18 |
| 2021/0291732 | A1* | 9/2021 | Woo | H04W 4/46 |
| 2021/0354722 | A1* | 11/2021 | Kim | B60K 35/85 |
| 2022/0099457 | A1* | 3/2022 | Shibayama | H04W 4/46 |
| 2023/0166771 | A1* | 6/2023 | Fernandez-Moral | G05D 1/227 701/2 |

* cited by examiner

VEHICULAR DRIVING ASSIST SYSTEM USING RADAR AND COMMUNICATION WITH OTHER VEHICLES

CROSS REFERENCE TO RELATED APPLICATION

The present application claims the filing benefits of U.S. provisional application Ser. No. 63/267,243, filed Jan. 28, 2022, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular sensing system or communication system includes a radar sensor disposed at a vehicle equipped with the vehicular sensing system and sensing exterior of the vehicle. The radar sensor captures radar data. The system includes an electronic control unit (ECU) with electronic circuitry and associated software. The electronic circuitry of the ECU includes a data processor for processing sensor data captured by the radar sensor to detect presence of objects in the field of view of the radar sensor. The system, responsive to processing by the data processor of sensor data captured by the radar sensor, detects presence of an object. The system, responsive to detecting the detected object, communicates one or more characteristics of the detected object to another vehicle. The detected object is not within line of sight of the other vehicle. The other vehicle, responsive to receiving the one or more characteristics of the detected object, directs a sensing system of the other vehicle based on the one or more characteristics.

For example, a vehicular sensing system includes a radar sensor disposed at a first vehicle and sensing exterior of the first vehicle, the radar sensor capturing radar data. An electronic control unit (ECU) is disposed at the first vehicle and includes electronic circuitry and associated software. The electronic circuitry of the ECU includes a data processor for processing sensor data captured by the radar sensor. The vehicular sensing system, responsive to processing by the data processor of sensor data captured by the radar sensor, detects presence of objects within a field of sensing of the radar sensor. Responsive to a sensing system of a second vehicle detecting an object while the detected object is not within the field of sensing of the radar sensor of the first vehicle, the vehicular sensing system receives from the second vehicle one or more characteristics of the detected object while the detected object is not within the field of sensing of the radar sensor of the first vehicle. The vehicular sensing system, responsive to receiving the one or more characteristics of the detected object from the second vehicle, adjusts sensing by the radar sensor of the first vehicle based at least in part on the received one or more characteristics of the detected object.

These and other objects, advantages, purposes and features of the present invention will become apparent upon review of the following specification in conjunction with the drawings.

DESCRIPTION OF THE PREFERRED EMBODIMENTS

A vehicular sensing system or communication system operates to capture sensor data such as radar data and/or images exterior of the vehicle and may process the captured sensor data to display images and/or to detect objects at or near the vehicle and in the predicted path of the vehicle, such as to assist a driver of the vehicle in maneuvering the vehicle in a forward or rearward direction. The sensing system includes a data processor or data processing system that is operable to receive sensor data from one or more sensors (e.g., radar sensors, cameras, etc.) and, for example, provide object detection or to provide an output to a display device for displaying images representative of the captured sensor data. Optionally, the sensing system may provide display, such as a rearview display or a top down or bird's eye or surround view display or the like.

Figure 1:
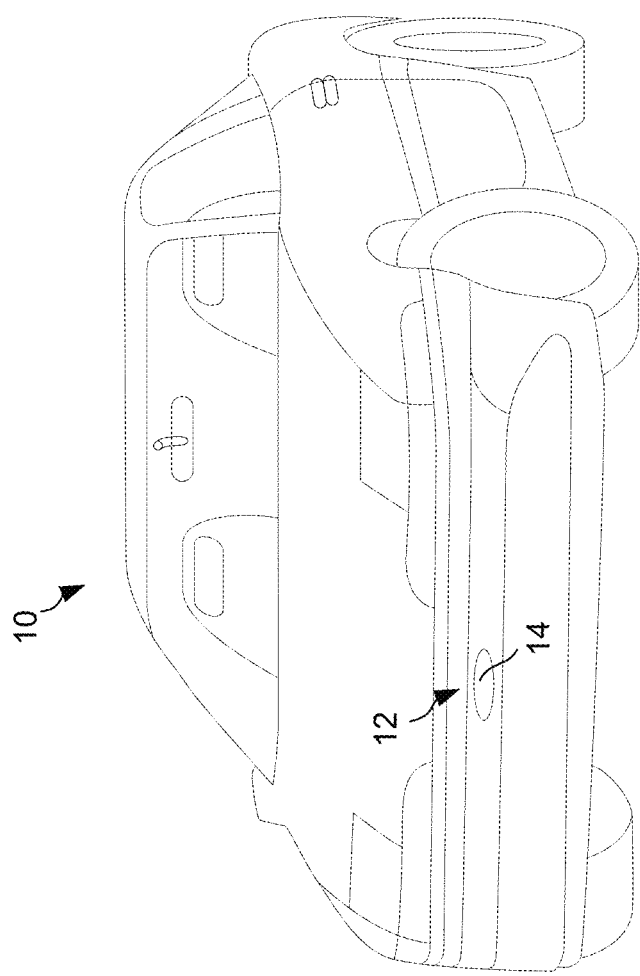
FIG. 1 is a perspective view of a vehicle with a sensing system that incorporates a radar sensor.

Referring now to the drawings and the illustrative embodiments depicted therein, a vehicle 10 (FIG. 1) includes a driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) that includes a data processor that is operable to process data captured by the radar sensor(s). The sensing system may also include a radar sensor that includes plurality of transmitters that transmit radio signals via plurality of antennas. The radar sensor also includes a plurality of receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controls at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Implementations herein are directed toward a cooperative driving system or sensor system that includes at least one radar sensor and a vehicle-to-infrastructure (V2X) and/or a vehicle-to-vehicle (V2V) system installed at the equipped vehicle. The system uses cooperation among different sensors (e.g., radar sensors) and shares information with other nearby vehicles such that the other vehicles have increased awareness of the environment (e.g., awareness of objects that sensors of the other vehicles cannot detect using their own sensors). For example, a radar system equipped on a first vehicle may sense the environment available around the vehicle using a line of sight (or a Light-of-Sight) mode (LOS). The radar system detects presence of target objects or objects of interest, such as a pedestrian, a bicycles, another vehicle, and other moving or stationary targets or objects. In addition to their position, the system may determine other aspects of the detected objects (e.g., direction of movement, velocity, acceleration, size, classification, etc.). The first vehicle may broadcast this information (e.g., object position, velocity, direction, etc.) to other nearby vehicles using V2X or V2V system which can be effective even in non-line-of-sight situations (N LOS) for the other vehicles. For example, when a first vehicle detects an object that a second vehicle does not have line-of-sight of, (e.g., an object that is around a corner of a cross-street of the second vehicle and not within the field of sensing of the sensor of the second vehicle), the first vehicle may transmit the object detection information to the second vehicle (e.g., via V2X or V2V communications). In this example, the second vehicle receives improved situational awareness from the cooperative sensing system as the second vehicle is provided information about the detected object before the sensors of the second vehicle are able to sense the detected object. The second vehicle may alert an occupant of the vehicle of the detected objects (e.g., via a display within the vehicle) and/or control an aspect of the vehicle (e.g., reduce speed) or make any other safety-related decision.

Figure 2:
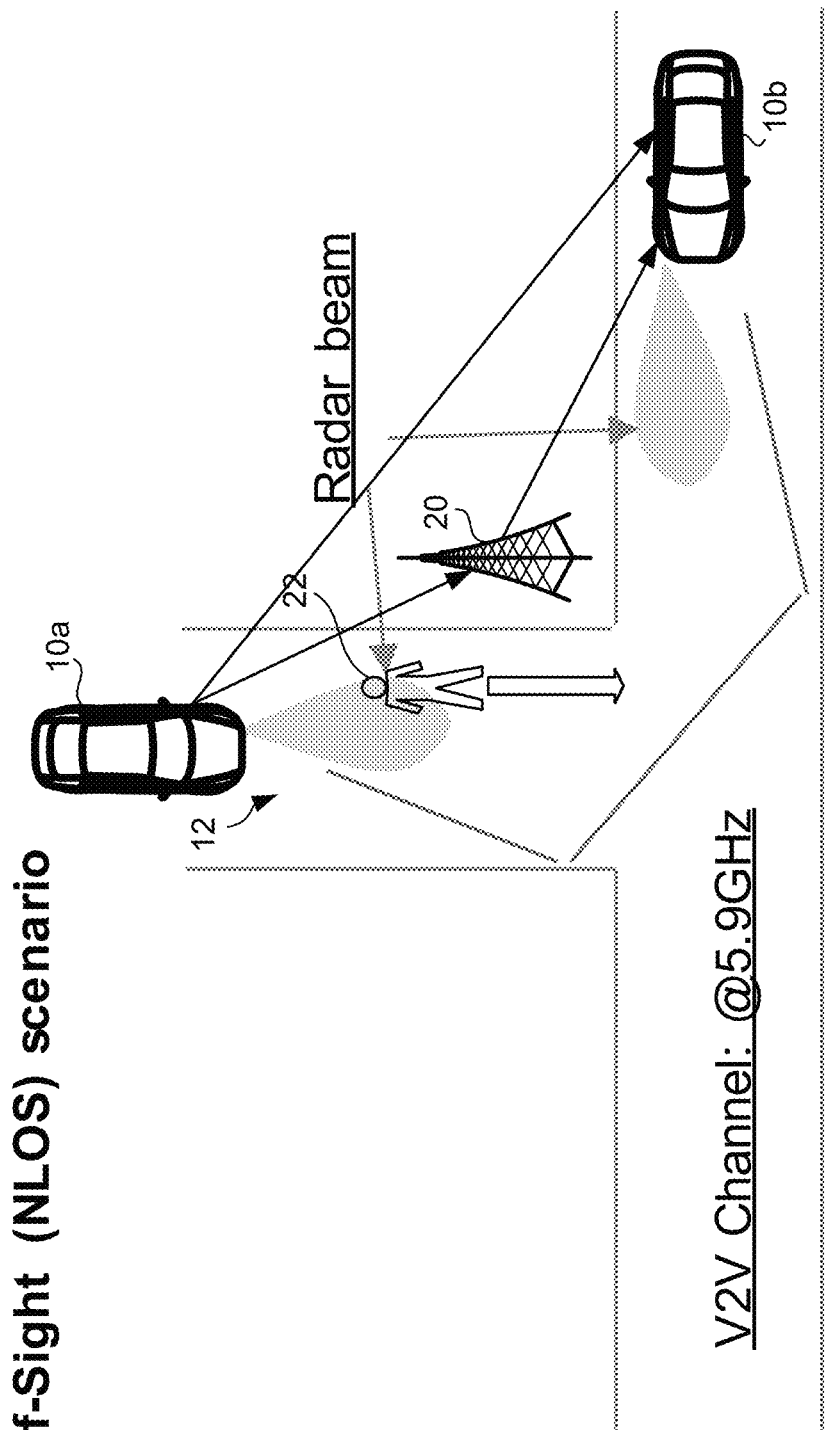
FIG. 2 is a schematic view of the system of FIG. 1 cooperating with another vehicle.

Referring now to FIG. 2, the cooperative system includes a radar system 12 of a first vehicle 10a that is capable of sensing the presence of objects within line-of-sight or field of sensing of one or more radar sensors of the radar system 12. Both the first vehicle 10a and a second vehicle 10b are equipped with a V2X or a V2V communication to allow communications to pass from the first vehicle 10a to the second vehicle 10b (either directly or via an intermediate communication element). When the vehicles are equipped with a V2X system (as opposed to a V2V system that allows the vehicles to communicate directly), an infrastructure element 20 will receive the information from the first vehicle 10a and forward the information to all appropriate vehicles within range (e.g., the second vehicle 10b). The infrastructure element 20 may be located in areas prone to vehicles losing line of sight such as at intersections, hills, curves in the road, etc. The V2V or V2X communication systems may operate using, for example, C-V2X and/or DSRC standards. The system may communicate at, for example, a 5.9 GHz channel.

As shown in the example in FIG. 2, the first vehicle 10a detects an object 22 (e.g., a pedestrian) within line of sight of a radar sensor of the radar system 12. A similar radar system of the second vehicle 10b does not have line of sight of the object 22 due to an intersection. Here, the first vehicle 10a (e.g., an ECU or other control of the vehicle) transmits object information (e.g., position, direction, velocity, acceleration, size, classification, etc.) to the infrastructure element 20 and/or the second vehicle 10b. The system may operate entirely autonomously (i.e., not require any direct intervention from occupants to detect, transmit, and receive object information). The second vehicle 10b, upon receiving the information, may direct sensing systems (e.g., a radar system or a camera system) to focus or scan in a direction of the objects. The system may use the information received (e.g., the velocity and direction) to predict a position of the object and scan or process or prioritize sensor data in that vicinity. For example, upon receiving an "awareness" message from the first vehicle informing the second vehicle of the presence of the object 22, the second vehicle may prepare/direct a radar system to scan in the direction indicated by the information provided by the first vehicle. In some examples, upon receiving indication of a detected object from another vehicle, the receiving vehicle may increase power, frequency, or other aspects of sensing in the direction of the detected object (e.g., focus on a region of interest). Optionally, the receiving vehicle may provide additional computational resources (e.g., processing and/or memory resources) to sensors sensing in the direction of the detected object.

The receiving vehicle may take any number of actions upon receiving an indication of an object from another vehicle, such as reducing speed, switching lanes, providing an alert to occupants of the vehicle (e.g., a visual, audible, and/or haptic alert), etc. The vehicle may determine which action to take based on the information received from the transmitting vehicle. For example, the vehicle may predict, based on the position, direction, and velocity of the detected object, the path of the object to determine whether the path of the object is likely to intersect with the vehicle. When the path of the object is likely to intersect with the vehicle, the vehicle may react accordingly (e.g., slow down or change lanes).

Thus, the systems described herein allow radar systems that operate only in line-of-sight modes to receive information in non-line-of-sight situations (e.g., intersections) by cooperating with the radar systems of other vehicles. Conventional V2X or V2V systems only transmit information regarding the vehicle itself, while the cooperative system described herein allows the transmission of objects external from the equipped vehicle. This provides the vehicle with enhanced situational awareness and increases the safety of all traffic participants (e.g., pedestrians, bicycles, and vehicles).

The system may be suitable for use on autonomous vehicles, so that the autonomous vehicle has enhanced awareness of objects that may be outside of the sensing field or range of the sensors. For autonomous vehicles suitable for deployment with the system, an occupant of the vehicle may, under particular circumstances, be desired or required to take over operation/control of the vehicle and drive the vehicle so as to avoid potential hazard for as long as the autonomous system relinquishes such control or driving. Such an occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle.

The system utilizes sensors, such as radar sensors or imaging radar sensors or lidar sensors or the like, to detect presence of and/or range to other vehicles and objects at the intersection. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2020-0132802; US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system communicates with other systems, such as via a vehicle-to-vehicle communication system or a vehicle-to-infrastructure communication system or the like. Such car2car or vehicle to vehicle (V2V) and vehicle-to-infrastructure (car2X or V2X or V21 or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 10,819,943; 9,555,736; 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:
a radar sensor disposed at a first vehicle equipped with the vehicular sensing system and sensing exterior of the first vehicle, the radar sensor capturing radar data;
an electronic control unit (ECU) disposed at the first vehicle, the ECU comprising electronic circuitry and associated software;
wherein the electronic circuitry of the ECU comprises a data processor for processing sensor data captured by the radar sensor;
wherein the vehicular sensing system, responsive to processing by the data processor of sensor data captured by the radar sensor, detects presence of objects within a field of sensing of the radar sensor;
wherein, responsive to a sensing system of a second vehicle detecting an object while the detected object is not within the field of sensing of the radar sensor of the first vehicle, the vehicular sensing system receives from the second vehicle one or more characteristics of the detected object while the detected object is not within the field of sensing of the radar sensor of the first vehicle; and
wherein the vehicular sensing system, responsive to receiving the one or more characteristics of the detected object from the second vehicle, adjusts sensing by the radar sensor of the first vehicle based at least in part on the received one or more characteristics of the detected object.

2. The vehicular sensing system of claim 1, wherein the second vehicle communicates the one or more characteristics of the detected object to the first vehicle using a vehicle-to-infrastructure (V2X) communication system.

3. The vehicular sensing system of claim 1, wherein the second vehicle communicates the one or more characteristics of the detected object to the first vehicle using a vehicle-to-vehicle (V2V) communication system.

4. The vehicular sensing system of claim 1, wherein the received one or more characteristics of the detected object comprises at least one selected from the group consisting of (i) a location of the detected object relative to the first vehicle, (ii) a velocity of the detected object, (iii) an acceleration of the detected object and (iv) a classification of the detected object.

5. The vehicular sensing system of claim 1, wherein the sensing system of the second vehicle comprises a radar sensing system.

6. The vehicular sensing system of claim 5, wherein the received one or more characteristics of the detected object comprises a location of the detected object relative to the first vehicle, and wherein the vehicular sensing system adjusts sensing by the radar sensor to scan for the detected object based on the received one or more characteristics of the detected object in a direction of the location of the detected object.

7. The vehicular sensing system of claim 1, wherein the second vehicle communicates with the first vehicle using a C-V2X or a DSRC standard.

8. The vehicular sensing system of claim 1, wherein the detected object comprises one selected from the group consisting of (i) a pedestrian, (ii) a bicycle, and (iii) a third vehicle.

9. The vehicular sensing system of claim 1, wherein the vehicular sensing system, responsive to receiving the one or more characteristics of the detected object, alerts an occupant of the first vehicle of the detected object.

10. The vehicular sensing system of claim 1, wherein the vehicular sensing system, responsive to receiving the one or more characteristics of the detected object, controls at least one selected from the group consisting of (i) speed of the first vehicle and (ii) steering of the first vehicle.

11. The vehicular sensing system of claim 10, wherein the vehicular sensing system predicts a path of travel of the detected object and adjusts sensing by the radar sensor of the first vehicle based at least in part on determination that the predicted path of travel of the detected object will intersect a path of travel of the first vehicle.

12. The vehicular sensing system of claim 11, wherein the vehicular sensing system at least one selected from the group consisting of (i) controls speed of the first vehicle based on the predicted path of the detected object and (ii) controls steering of the first vehicle based on the predicted path of the detected object.

13. The vehicular sensing system of claim 1, wherein the vehicular sensing system increases computational resources provided to the ECU based on receiving the one or more characteristics.

14. A vehicular sensing system, the vehicular sensing system comprising:
   a radar sensor disposed at a first vehicle equipped with the vehicular sensing system and sensing exterior of the first vehicle, the radar sensor capturing radar data;
   an electronic control unit (ECU) disposed at the first vehicle, the ECU comprising electronic circuitry and associated software;
   wherein the electronic circuitry of the ECU comprises a data processor for processing sensor data captured by the radar sensor;
   wherein the vehicular sensing system, responsive to processing by the data processor of sensor data captured by the radar sensor, detects presence of objects within a field of sensing of the radar sensor;
   wherein, responsive to a sensing system of a second vehicle detecting a pedestrian while the detected pedestrian is not within the field of sensing of the radar sensor of the first vehicle, the vehicular sensing system receives from the second vehicle characteristics of the detected pedestrian while the detected pedestrian is not within the field of sensing of the radar sensor of the first vehicle;
   wherein the received characteristics of the detected pedestrian comprises (i) a location of the detected pedestrian relative to the first vehicle and (ii) direction of travel of the detected pedestrian; and
   wherein the vehicular sensing system, responsive to receiving the characteristics of the detected pedestrian from the second vehicle, adjusts sensing by the radar sensor of the first vehicle based at least in part on the received characteristics of the detected pedestrian.

15. The vehicular sensing system of claim 14, wherein the vehicular sensing system adjusts sensing by the radar sensor to scan for the detected pedestrian in a direction of the location of the detected object.

16. The vehicular sensing system of claim 14, wherein the vehicular sensing system, responsive to receiving the characteristics of the detected pedestrian, alerts an occupant of the first vehicle of the detected pedestrian.

17. The vehicular sensing system of claim 14, wherein the vehicular sensing system predicts a path of the detected pedestrian and adjusts sensing by the radar sensor of the first vehicle based at least in part on determination that the predicted path of the detected pedestrian will intersect a path of travel of the first vehicle.

18. The vehicular sensing system of claim 17, wherein the vehicular sensing system at least one selected from the group consisting of (i) controls speed of the first vehicle based on the predicted path of the detected pedestrian and (ii) controls steering of the first vehicle based on the predicted path of the detected pedestrian.

19. A vehicular sensing system, the vehicular sensing system comprising:
   a radar sensor disposed at a first vehicle equipped with the vehicular sensing system and sensing exterior of the first vehicle, the radar sensor capturing radar data;
   an electronic control unit (ECU) disposed at the first vehicle, the ECU comprising electronic circuitry and associated software;
   wherein the electronic circuitry of the ECU comprises a data processor for processing sensor data captured by the radar sensor;
   wherein the vehicular sensing system, responsive to processing by the data processor of sensor data captured by the radar sensor, detects presence of objects within a field of sensing of the radar sensor;
   wherein, responsive to a sensing system of a second vehicle detecting an object while the detected object is not within the field of sensing of the radar sensor of the first vehicle, the vehicular sensing system receives from the second vehicle characteristics of the detected object while the detected object is not within the field of sensing of the radar sensor of the first vehicle;
   wherein the received characteristics of the detected object comprises at least (i) a location of the detected object relative to the first vehicle, (ii) direction of travel of the detected object;
   wherein the vehicular sensing system, responsive to receiving the characteristics of the detected object from the second vehicle, adjusts sensing by the radar sensor of the first vehicle based at least in part on the received characteristics of the detected object; and
   wherein, based on the received characteristics, the vehicular sensing system predicts a path of travel of the detected object and adjusts sensing by the radar sensor of the first vehicle based at least in part on determination that the predicted path of travel of the detected object will intersect a path of travel of the first vehicle.

20. The vehicular sensing system of claim 19, wherein the vehicular sensing system adjusts sensing by the radar sensor to scan for the detected object based on the received characteristics of the detected object in a direction of the location of the detected object.

21. The vehicular sensing system of claim 19, wherein the detected object comprises one selected from the group consisting of (i) a pedestrian, (ii) a bicycle, and (iii) a third vehicle.

22. The vehicular sensing system of claim 19, wherein the vehicular sensing system, responsive to receiving the characteristics of the detected object, alerts an occupant of the first vehicle of the detected object.

23. The vehicular sensing system of claim 19, wherein the vehicular sensing system, responsive to receiving the characteristics of the detected object, controls at least one selected from the group consisting of (i) speed of the first vehicle and (ii) steering of the first vehicle.

24. The vehicular sensing system of claim 23, wherein the vehicular sensing system at least one selected from the group consisting of (i) controls speed of the first vehicle based on the predicted path of the detected object and (ii) controls steering of the first vehicle based on the predicted path of the detected object.

* * * * *